United States Patent
Furukawa et al.

(10) Patent No.: US 8,697,516 B2
(45) Date of Patent: Apr. 15, 2014

(54) CAPACITOR AND A METHOD OF MANUFACTURING THE SAME

(75) Inventors: Yukiko Furukawa, Veldhoven (NL); Jinesh Balakrishna Pillai Kochupurackal, Eindhoven (NL); Johan Hendrik Klootwijk, Eindhoven (NL); Frank Pasveer, Dordrecht (NL)

(73) Assignee: NXP, B.V., Eindhoven (NL)

( * ) Notice: Subject to any disclaimer, the term of this patent is extended or adjusted under 35 U.S.C. 154(b) by 147 days.

(21) Appl. No.: 13/061,121

(22) PCT Filed: Aug. 11, 2009

(86) PCT No.: PCT/IB2009/053532
§ 371 (c)(1),
(2), (4) Date: Feb. 25, 2011

(87) PCT Pub. No.: WO2010/023575
PCT Pub. Date: Mar. 4, 2010

(65) Prior Publication Data
US 2011/0147891 A1    Jun. 23, 2011

(30) Foreign Application Priority Data

Aug. 26, 2008 (EP) ..................................... 08105131

(51) Int. Cl.
*H01L 29/94* (2006.01)
(52) U.S. Cl.
USPC .......................................... 438/240; 257/532
(58) Field of Classification Search
USPC .......................................... 257/532; 438/240
See application file for complete search history.

(56) References Cited

U.S. PATENT DOCUMENTS

| 3,720,862 | A | | 3/1973 | Mason |
| 5,144,529 | A | * | 9/1992 | Takahashi ..................... 361/323 |
| 6,455,916 | B1 | | 9/2002 | Robinson |
| 6,514,603 | B2 | * | 2/2003 | Chazono ........................ 428/213 |
| 6,649,424 | B2 | * | 11/2003 | Mort et al. .......................... 438/3 |
| 7,067,341 | B2 | * | 6/2006 | Mascolo et al. ................ 438/48 |
| 7,218,506 | B2 | * | 5/2007 | Kobayashi et al. ........... 361/523 |
| 7,244,999 | B2 | * | 7/2007 | Aihara ........................... 257/528 |
| 7,842,946 | B2 | * | 11/2010 | Lin et al. ......................... 257/40 |
| 7,906,206 | B2 | * | 3/2011 | Park et al. ....................... 428/323 |
| 8,192,851 | B2 | * | 6/2012 | Aman et al. ................... 428/701 |
| 2001/0012561 | A1 | | 8/2001 | Chazono |
| 2002/0197743 | A1 | | 12/2002 | Mort et al. |
| 2003/0072126 | A1 | | 4/2003 | Bhattacharyya |
| 2006/0001069 | A1 | | 1/2006 | Tomonaga et al. |

(Continued)

FOREIGN PATENT DOCUMENTS

EP    1 414 078 A1    4/2004
EP    1 675 131 A1    6/2006

(Continued)

OTHER PUBLICATIONS

Fan, L., et al : "Use of Dispersant in High K polymer-Ceramic Nano-Composite to Improve Manufacturability and Performance of Integral Capacitors," 2002 Proceedings 52nd., Electronic Components and Technology Conference, San Deigo, CA, IEEE, vol. CONF. 52, pp. 936-940, (May 28, 2002).

(Continued)

*Primary Examiner* — Eugene Lee

(57) ABSTRACT

A capacitor (110), wherein the capacitor (110) comprises a capacitor dielectric (112) comprising a dielectric matrix (114) of a first value of permittivity, and a plurality of nanoclusters (116) of a second value of permittivity which is larger than the first value of permittivity which are at least partially embedded in the dielectric matrix (114), wherein the plurality of nanoclusters (116) are formed in the dielectric matrix (114) by spontaneous nucleation.

3 Claims, 1 Drawing Sheet

(56) References Cited

U.S. PATENT DOCUMENTS

| | | | |
|---|---|---|---|
| 2006/0022304 A1* | 2/2006 | Rzeznik | 257/532 |
| 2006/0088709 A1 | 4/2006 | Ito et al. | |
| 2006/0228549 A1* | 10/2006 | Kakimoto et al. | 428/402 |
| 2006/0286696 A1* | 12/2006 | Peiffer et al. | 438/27 |
| 2007/0097597 A1 | 5/2007 | Ko et al. | |
| 2007/0116976 A1 | 5/2007 | Tan et al. | |
| 2008/0291601 A1 | 11/2008 | Roozeboom et al. | |
| 2010/0230787 A1 | 9/2010 | Guiraud et al. | |

FOREIGN PATENT DOCUMENTS

| | | |
|---|---|---|
| EP | 1 867 464 A1 | 12/2007 |
| WO | 01/89827 A1 | 11/2001 |
| WO | 01/99167 A2 | 12/2001 |
| WO | 2004/004026 A2 | 1/2004 |
| WO | 2007/125510 A2 | 11/2007 |

OTHER PUBLICATIONS

Xu, J., et al. : "Optimization of Epoxy-Barium Titanate Nanocomposites for High Preformance Embedded Capacitor Components," IEEE Transactions on Components and Packaging Technologies, IEEE Service Center, Piscataway, NJ, US, vol. 30 No. 2, pp. 248-253, (Jun. 1, 2007).

International Search Report for Int'l. Patent Appln. No. PCT/IB2009/053532.

* cited by examiner

CAPACITOR AND A METHOD OF MANUFACTURING THE SAME

FIELD OF THE INVENTION

The invention relates to a capacitor.

Moreover, the invention relates to a method of manufacturing a capacitor.

BACKGROUND OF THE INVENTION

A capacitor may be denoted as an electrical device that can store energy in the electric field between a pair of conductors (which may be denoted as plates). The process of storing energy in the capacitor may be denoted as charging and involves electric charges of equal magnitude, but opposite polarity, building up on each plate.

US 2006/0001069 discloses a composition for forming a dielectric layer with an appropriate dielectric constant and capable to withstand voltage properties. A MIM capacitor and a process for its production are disclosed. A composition for forming a dielectric layer is provided, which comprises fine particles of perovskite type dielectric crystal, glass frit, and a hydrolysable silicon compound or its oligomer, and a MIM capacitor comprising a substrate, and a bottom electrode layer, a dielectric layer having a structure such that fine particles of perovskite type dielectric crystal are dispersed in a silicon oxide matrix containing glass-forming ions and a top electrode, formed on the substrate in this order.

However, the above mentioned method involves several processing steps such as firing raw materials, milling and mixing to form a coating solution, curing the film, which is cumbersome. Further, the values of capacitance obtainable with the conventional capacitors may be small particularly if the curing temperature is lower than 400° C., which is presently believed to be the maximum temperature to be able to cure an integrated circuit (IC) embedded substrate. Also, the thickness of the film is in the order of micrometers, which is rather thick.

OBJECT AND SUMMARY OF THE INVENTION

It is an object of the invention to provide a capacitor architecture which can be manufactured with a sufficiently high value of capacitance.

In order to achieve the object defined above, a capacitor and a method of manufacturing a capacitor according to the independent claims are provided.

According to an exemplary embodiment of the invention, a capacitor is provided, wherein the capacitor comprises a capacitor dielectric (which may be an electrically insulating layer sandwiched between two parallel aligned electrode plates) comprising a dielectric matrix of a first value of permittivity, and a plurality of nanoclusters of a second value of permittivity which is larger than the first value of permittivity which are at least partially embedded in (or arranged within) the dielectric matrix, wherein the plurality of nanoclusters are formed in the dielectric matrix by spontaneous nucleation (particularly the plurality of nanoclusters are formed during depositing the dielectric matrix by a shared deposition procedure).

According to another exemplary embodiment of the invention, a method of manufacturing a capacitor is provided, wherein the capacitor is formed with a capacitor dielectric, the method comprising forming a dielectric matrix of the capacitor dielectric to have a first value of permittivity, and at least partially embedding a plurality of nanoclusters of a second value of permittivity which is larger than the first value of permittivity in the dielectric matrix, wherein the plurality of nanoclusters are formed in the dielectric matrix by spontaneous nucleation.

The term "matrix" may particularly denote a physical medium that surrounds and holds nanoclusters of another material. A matrix may be a three-dimensional material block which has recesses or holes which are basically entirely filled with the nanoclusters, consequently holding the nanoclusters in place. A matrix may thus denote a principal phase of a material in which another constituent is embedded. In an embodiment, the volume of the matrix material may be larger than the volume of the nanoclusters. A matrix may be a binding, surrounding substance within which nanoclusters develop or are contained.

The term "nanoclusters" may particularly denote physical particles being surrounded at least partially by a matrix so that a direct physical contact is formed between matrix and nanocluster. Such nanoclusters or nanoparticles may have dimensions in the order of magnitude between about 0.5 nm and about 100 nm, particularly between about 1 nm and about 50 nm. Such nanoclusters may have various shapes such as a spherical shape or shapes with lower degrees of order. Examples for such nanoclusters are material inclusions in a surrounding material of another phase or chemical composition formed spontaneously during production, particles which are supplied to another material and become solidified, etc. In an embodiment, nanoclusters are particles of multiple atoms or molecules formed by a deposition technique so as to be surrounded by another medium. Preferably, the nanoclusters are spontaneously crystallized nano-crystalline particles.

The term "permittivity" (which may be denoted as $\epsilon_r$) may denote a physical quantity that describes how an electric field effects and is affected by a dielectric medium. The permittivity is determined by the ability of a material to polarize in response to an electric field, and thereby reduce the total electric field inside the material. Permittivity is related to electric susceptibility.

The term "spontaneous nucleation" of the nanoclusters in the matrix may denote a kind of material segragation process, which occurs due to intermolecular force of materials. If the intermolecular force between same molecules is stronger than that between different molecules, the phase segregation occurs. Without wishing to be bound to a specific theory, for instance using atomic layer deposition (ALD), a dielectric precursor material (metal-organic compounds) is pulsed over a substrate functionalized with hydroxyl groups, this causes a chemical reaction resulting in a bond between the metal ion in the dielectric precursor and an hydroxyl group of the substrate surface. In a next step, the substrate may be exposed to an oxide source, thereby forming a dielectric layer. Next, a different dielectric may be grown over the dielectric layer. This further dielectric precursor compound reacts with the available oxide sites of the dielectric layer, is converted into a further dielectric material by exposure to an oxide source. With a certain combination and processing condition, the chemical reactions cause a segregation of materials due to a difference in surface free energy of the materials, which results in a nucleation process in the further dielectric material, thus leading to the self-assembly of the further dielectric material into nanoclusters within the matrix of the first dielectric material.

The skilled person will easily recognize that nanoclusters embedded in a matrix and formed simultaneously with the matrix by spontaneous nucleation is clearly distinguishable structurally from nanoclusters embedded in a matrix and formed by a mixture of ready made nanoparticles and ready made matrix material, which mixture is then converted into a bound or solid state. The inventive procedure will result is in highly ordered solid state body with very few defects and with grain boundaries being basically free of structural mismatch. On the other hand, the conventional structure will suffer from a large density of structural or lattice defects and will be clearly distinguishable from the inventive structure by a microstructure analysis, particularly by the crystalline properties of the nanoclusters and by an analysis of grain boundaries. For example, the skilled person may easily perform such an analysis by electron microscopy, particularly by transmission electron microscopy (TEM).

In an embodiment, a capacitor dielectric particularly for integrated circuit (IC) applications may be provided, comprising a matrix which may be made for instance of a polymer material and a high dielectric constant particular filler in the form of nanoclusters embedded in such a matrix. Thin film processing may form such a system, wherein a small thickness of the dielectric layer may contribute to achieve very high values of capacitance of the capacitor. Thus, even for integrated circuit applications in which miniaturization can be further continued, providing such small dimensioned capacitors may allow to fabricate capacitors on the nanoscale with sufficiently high capacitance values. Particularly, thin films of for instance 10 nm or less, may be fabricated so that they can be applied properly as gate dielectric materials, replacing conventional high-k dielectric layers that may suffer from low breakdown fields. It is possible to manufacture such nanoclusters embedded within a matrix during one thin film processing procedure, for instance in a common atomic layer deposition (ALD) or chemical vapour deposition (CVD) procedure. When forming the nanoclusters in the matrix, a spontaneous nucleation of the nanoclusters in the matrix may be promoted (particularly by depositing both constituents of the dielectric layer in a common manufacture procedure, more particularly by simultaneously supplying precursors for both constituents during a deposition procedure). Taking the latter measure may allow obtaining a mechanically and electrically stable dielectric layer and may allow simultaneously manufacturing the capacitor with a high value of capacitance.

Next, further exemplary embodiments of the capacitor will be explained. However, these embodiments also apply to the method.

The dielectric matrix of the capacitor may comprise a polymer. The term "polymer" may denote a long molecule consisting of a chain of identical parts, called monomers. A polymer may be formed by polymerization, the joining of identical molecules. Such a polymer may have a value of the permittivity of, for instance, four or the like. Such a polymer may be mechanically stable and may serve as a proper matrix for accommodating nanoclusters in a chemically compatible manner.

The plurality of nanoclusters may comprise a high-k material. A high-k material may be denoted as a dielectric material with a sufficiently large dielectric constant. This may allow to provide sufficiently large values of capacitance of a capacitor. The implementation of such high-k capacitor dielectrics is a proper strategy to allow further miniaturization of microelectronic components without deteriorating the performance of such materials.

The dielectric matrix may comprise a low-k material. Thus, the k value of the dielectric matrix may be smaller than the dielectric value of the nanoclusters.

The nanoclusters may consist of a material of the second value of permittivity. In such an embodiment, the nanoclusters may be made of a single homogeneous material, which is the same in different portions of the nanoclusters. Also different nanoclusters of a capacitor may be made of the same material. This may allow manufacturing the capacitor with reasonable effort.

Alternatively, different nanoclusters may be made of different materials having different values of the permittivity. Hence, additional design parameters for adjusting the properties of the capacitor may be provided. However, also in such embodiment, the individual nanoclusters may be homogeneous. This may allow to keep the manufacture procedure simple.

In an alternative embodiment, the nanoclusters may comprise a (for instance spherical) core and a shell (for instance spherical shell) surrounding the core. The shell may be made of a material having a smaller value of permittivity than a material of the core. With such core-shell nanoclusters, it is possible to specifically adapt the shell for providing a proper binding with the matrix and as a barrier layer preventing undesired migration and the like, wherein an interior of the shell may be formed of a core being optimizable regarding the dielectric properties of the capacitor. Thus the freedom of design may be further increased with such an arrangement.

The shell may be made of a low-k material. For the thin shell it is not necessary that it significantly contributes to the capacitance of the capacitor. The latter property may be fulfilled primarily by high-k properties of the nanoclusters, since the shell may be optimized regarding other properties such as binding, chemical compatibility, etc.

The capacitor may be adapted as a monolithically integrated capacitor. Thus, the capacitor may be monolithically integrated in a semiconductor substrate in which further electric components may be provided. As an example, the high capacitor structure may be used as a part of a memory cell, for instance in combination with selection transistors such as field effect transistors. Many other applications of the capacitance are possible, for instance resonance circuits, filters, or the like in which the capacitor may be monolithically integrated in a substrate with further microelectronic components such as an inductance, a resistor, or the like.

The capacitor may be a MOS capacitor (Metal Oxide Semiconductor). Alternatively, the capacitor may be a MIM (Metal Insulator Metal) capacitor. Therefore, many different configurations are possible, for instance in metal technology or in semiconductor technology.

The capacitor may comprise a first electrode (such as a first metal layer or a structure of any other electrically conducting material) on which the plurality of nanoclusters and the dielectric matrix may be deposited. Thus, the first electrode may serve as a support or substrate or template for receiving material forming the dielectric layer of the capacitor, which may be formed by thin film processing such as ALD or CVD.

The capacitor may further comprise a second electrode (such as a second metal layer or a structure of any other electrically conducting material) arranged on the plurality of nanoclusters and the dielectric matrix. After having deposited a thin film of nanoclusters and matrix, it is possible to produce a second electrode so that the two electrodes sandwich the capacitor dielectric having a sufficiently high value of capacitance.

The first electrode and/or the second electrode may be in direct mechanical contact with at least a part of the plurality of nanoclusters. In such an embodiment it is possible that between two corresponding opposing sections of the first electrode and the second electrode, at a maximum one nanocluster is present. The prevention of several nanoclusters connected in series (from an electric point of view) may be advantageous, since a series connection of capacitors may reduce the capacitance value. Thus, by ensuring that only one nanocluster is arranged in a path directly connecting the first electrode with the second electrode, such an undesired possible reduction of the capacitance may be safely prevented.

Each of the nanoclusters may have a dimension of about 0.5 nm to about 100 nm, particularly may have a dimension of about 1 nm to about 50 nm. These dimensions may be average values averaged over the nanoclusters of a capacitor. Such a dimension may be a spatial extension along a single one, two, or three coordinate axes. The plurality of nano clusters and the dielectric matrix may together form a thin film; particularly form a layer having a thickness between about 1 nm and about 10 µm, more particularly having a thickness between about 10 nm and about 100 nm. With such a small thickness in a direction perpendicular to an extension of the electrodes (serving as capacitor plates) a sufficiently high value of the capacitance may be obtained.

As dielectric materials for the nanoclusters and the matrix, it is possible to use any dielectric material such as metal oxide, metal nitride, metal fluoride, metal chloride and organic dielectric materials. For instance, $SiO_2$, $Si_3N_4$, MgO, $Al_2O_3$, $P_2O_5$, $P_4O_{10}$, CaO, $Sc_2O_3$, $TiO_2$, $Fe_2O_3$, $WoO_3$, $SnO_2$, $Cr_2O_3$, NiO, $Ga_2O_3$, $GeO_2$, $As_2O_3$, SrO, $Y_2O_3$, $ZrO_2$, $Mb_2O_5$, $In_2O_3$, $Sb_2O_3$, $TeO_2$, BaO, $La_2O_3$, $CeO_2$, $PrO_2$, $Nd_2O_3$, $Sm_2O_3$, $Gd_2O_3$, $Dy_2O_3$, $Ho_2O_3$, $Er_2O_3$, $Yb_2O_3$, $Lu_2O_3$, $HfO_2$, $Ta_2O_5$, ZrX $Si_{1-x}O_y$, $Si_{1-x}O_y$ ($HfSiO_4$), $MgAl_2O_4$, AlX $Zr_{1-x}O_2$, $LaAlO_3$, LaAlOn, $YAlO_3$, $Y_3Al_5O_{12}$, $BaTiO_3$, $SrTiO_3$, $PbTiO_3$, $CaTiO_3$, $Bi_4Ti_3O_{12}$, $Bi_{12}TiO_{20}$, $MgTiO_3$, $CaTiO_3$, $SrZrO_3$, $BaZrO_3$, $PbZrO_3$, Ysz, $LiNbO_3$, $SrBi_2Tr_2O_9$, $KtAO_3$, $GaAsO_4$ or $InPO_4$.

For instance, the cluster can be any high-k dielectric material. For instance, $BaTiO_3$ may be implemented as a perovskite ferroelectric material, which may have a k-value of more than 10,000, depending on microstructure and processing. Also other perovskite materials such as $SrTiO_3$, $PbTiO_3$, $PbZrTiO_3$ and its solid solutions, further $Bi_4Ti_3O_{12}$, $Bi_{12}TiO_{20}$, $TiO_2$ can be used.

For instance, the matrix material can be any low-k dielectric such as metal oxide, metal nitride, metal fluoride, metal chloride and organic dielectric materials. Possible low-k dielectric materials as a matrix is organic/polymer material and a binary metal oxide such as $SiO_2$, $Ga_2O_3$, $GeO_2$, $Nb_2O_5$, $In_2O_3$, $Sb_2O_3$, $HfO_2$, $ZrO_2$, $Al_2O_3$, $Y_2O_3$, $La_2O_3$, $Pr_2O_3$, $Gd_2O_3$ silicate and mixtures of these materials. They may have a relatively low-k value of 10 to 30.

In the following, further exemplary embodiments of the method will be explained. However, these embodiments also apply to the capacitor.

The plurality of nanoclusters and the dielectric matrix may be deposited simultaneously in a common procedure. By manufacturing these two components in a common step, it is possible that the manufacture time is kept short and the costs for manufacture are kept small as well.

The plurality of nanoclusters and the matrix may be manufactured by thin film technology, particularly by CVD, more particularly PECVD (plasma enhanced chemical vapour deposition), or ALD. Particularly with ALD, it is possible to define the thickness of the matrix with the embedded nanoclusters with very high accuracy. MBE (molecular beam epitaxy) and sputtering are other alternatives for appropriate manufacture methods.

Since embodiments of the invention allow the combination of a large number of different materials, design freedom is achieved allowing for optimizing the material combination of nanoclusters and matrix in accordance with requirements of a specific application. In this context, the dielectric properties of the corresponding materials may be selected to adjust the capacitance value.

For any method step, any conventional procedure as known from semiconductor technology may be implemented. Forming layers or components may include deposition techniques like CVD, PECVD, ALD, oxidation or sputtering. Removing layers or components may include etching techniques like wet etching, plasma etching, etc., as well as patterning techniques like optical lithography, UV lithography, electron beam lithography, etc.

Embodiments of the invention are not bound to specific materials, so that many different materials may be used. For conductive structures, it may be possible to use metallization structures, silicide structures or polysilicon structures. For semiconductor regions or components, crystalline silicon may be used. For insulating portions, silicon oxide or silicon nitride may be used.

The system may be formed on a purely crystalline silicon wafer or on an SOI wafer (Silicon On Insulator).

Any process technologies like CMOS, BIPOLAR, BIC-MOS may be implemented.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
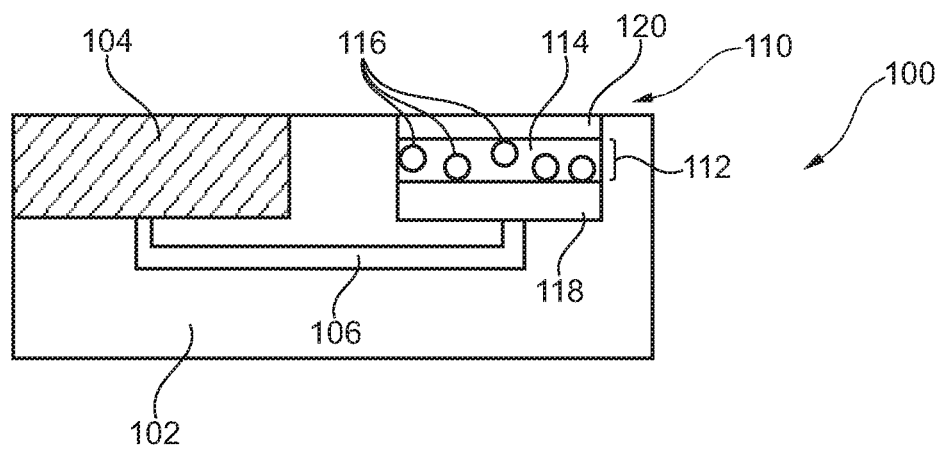
FIG. 1 illustrates an integrated circuit according to an exemplary embodiment of the invention having integrated a capacitor according to an exemplary embodiment of the invention.

The illustration in the drawing is schematical. In different drawings, similar or identical elements are provided with the same reference signs.

FIG. 1 illustrates an integrated circuit 100 according to an exemplary embodiment of the invention.

The integrated circuit 100 is formed in silicon technology, that is to say is formed in a crystalline silicon substrate 102. The integrated circuit 100 comprises an integrated circuit portion 104 in which a plurality of integrated circuit components such as inductances, resistors, transistors, etc. may be monolithically integrated. The integrated circuit 100 further comprises a monolithically integrated capacitor 110 electrically coupled to the integrated circuit portion 104 via an electrically conductive trace 106. Thus, the capacitor 110 may interact with the monolithically integrated circuit components 104, for instance to form a resonance circuit, an oscillator circuit, a filter, a memory cell, etc.

The capacitor 110 comprises a thin film capacitor dielectric layer 112 which is formed of a dielectric matrix 114 of a first value of the electric permittivity. A plurality of nanoclusters 116 of a second value of the electric permittivity which is larger than the first value of the permittivity are embedded in the dielectric matrix 114. The dielectric matrix 114 is made of a polymer material, whereas the plurality of nanoclusters 116 comprise a high-k material in the embodiment of FIG. 1. The nanoclusters 116 are made of a single material, that is to say have a homogeneous structure.

A first electrode 118 is provided below the thin film capacitor dielectric layer 112 and is made of a metallic or semiconductive material (such as polycrystalline silicon or copper) on which the plurality of nanoclusters 116 and the dielectric matrix 114 are deposited by CVD in a common manufacture procedure.

The relative percentage of material of the nanoclusters 116 and the dielectric matrix 114 can be defined by adjusting the CVD procedure, for instance by correspondingly setting the precursor composition. By defining the CVD process parameters it is also possible to define further parameters such as a diameter of the nanoclusters 116. Moreover, a spontaneous nucleation of the nanoclusters 116 may be adjusted and promoted by correspondingly selecting the CVD parameters.

A second electrode 120 which can also be made of a semiconductor material (such as polycrystalline silicon) or a metallic material (such as copper) is arranged on the plurality of nanoclusters 116 and the dielectric matrix 114. In the embodiment of FIG. 1, the nanoclusters 116 are spheres having a diameter of about 10 nm. A thickness of the thin film 112 in a vertical direction according to FIG. 1 is 30 nm.

Figure 2:
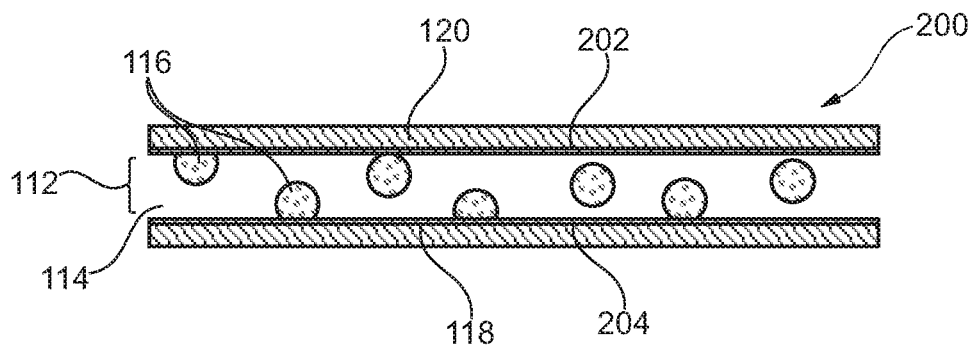
FIG. 2 and FIG. 3 illustrate arrangements of capacitors according to exemplary embodiments of the invention.

FIG. 2 shows a capacitor 200 according to another exemplary embodiment of the invention.

In the embodiment shown in FIG. 2, an optional thin dielectric layer 202 may be formed between the thin film 112 and the upper electrode 120. A further thin dielectric layer 204 is provided between the thin film 112 and the second electrode 118. Both dielectric layers 202, 204 may be low-k dielectric layers. In the embodiment of FIG. 2, care has be taken that the particles 116 are brought to a state in which their spatial arrangement does not reduce the capacitance in an undesired value.

FIG. 2 shows a schematic drawing of a super capacitor 200 comprising a cluster-matrix structure with the high-k clusters 116 within the low-k matrix 114.

If a ferroelectric material is used as a high-k material it may be appropriate to use the material being in a certain condition (regarding temperature, size of clusters, in the electric or magnetic field). Ordered electric dipole moments are the origin of a high k-value of ferroelectric material. If each ferroelectric clusters in a thin film capacitor has a different direction of dipole moment (randomly distributed or opposite each other), the total dielectric constant in the film may be very low or close to zero due to an offset of those dipole moments relative to each other. This can also apply for a cluster with different directions of dipole moments within the cluster. Therefore, it may be advantageous to form ordered dipole moments or cease the dipole moment. At a Curie point (Tc) ferroelectric material may change its crystal structure to cubic, which may cease spontaneous dipole polarization, above Tc ferroelectric materials may turn to be paraelectric. The value of Tc can be tuned with dopants.

For instance, for Barium Titanate ($BaTiO_3$), Sr, Pb or Zr may be used to shift the Curie temperature in a desired way. If clusters 116 are present being smaller than the domain sizes of a ferroelectric material (for instance 5 nm to 100 nm), then a dipole moment of the ferroelectric cannot exist or cannot change its direction, then it becomes a so-called superparaelectric. This option may be obtained automatically due to the nature of certain thin film deposition techniques such as ALD (Atomic Layer Deposition). Another option is to use magnetic or electric fields to control the direction to form an ordered dipole moment. The above-mentioned options can also be combined to further improve the properties of the capacitor 200. Hence, it is possible to benefit from the high-k material because of relatively high dielectric constants.

In the embodiment of FIG. 2, in each vertical connection path between the electrodes 118, 120, only a single cluster 116 is provided at the maximum. Thus, any undesired serial connection of capacitors, which may reduce the entire capacitance of the arrangement 200, may be safely prevented.

Figure 3:
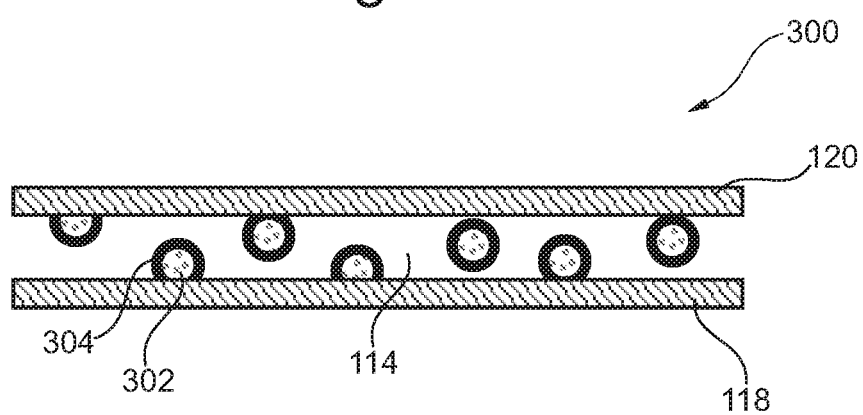

FIG. 3 shows a capacitor 300 according to another exemplary embodiment.

In this embodiment, the nanoclusters comprise a core 302 and comprise a shell 304 surrounding the core 302, the shell 304 is made of a material of a value of conductivity being smaller than the value of conductivity of the material of the core 302. Thus, the shells 304 may serve as some kind of barrier layer allowing to adjust appropriate compatibility between the different materials. The shell 304 can even be made of a low-k material, whereas the core 302 should be made of a high-k material. FIG. 3 shows an embodiment 300 in which an undesired serial connection of capacitors is prevented.

FIG. 3 shows a schematic drawing of a super capacitor 300 comprising a cluster-matrix structure with clusters having the high-k core 302 and the low-k shell 304 densely packed to each other or dispersed in the low-k dielectric matrix 114.

According to an exemplary embodiment of the invention, a super capacitor consisting of high-k dielectric clusters, for instance core-shell clusters, is provided.

An embodiment of the invention is based on a dielectric layer with which it may be possible to greatly enhance the capacitance density, and realize ultrahigh (>400 $nF/mm^2$ or more) capacitors in silicon. Exemplary fields of application are integrated MOS and MIM capacitors on three-dimensional silicon substrates. These may be implemented in applications like decoupling and filtering. Another exemplary class of applications is RF supply-line decoupling, phase-locked loop filtering, power management (DC-DC conversion), back-up power (integrated battery) supply (μWatt domain in ambient intelligence), etc. Ultrahigh-value capacitors according to an exemplary embodiment of the invention may enable breakthroughs in cost-effective off-chip decoupling in digital TV, highly integrated DC-DC conversion (for instance in PMU devices), etc., for which density requirements up to 300 to 400 nF/mm2 or more may become possible.

Another embodiment can be the use of a super capacitor as an energy storage device for wireless sensors connected to an energy scavenging means like solar cells (especially due to their envisaged low leakage character).

Methods, in particular using the third dimension, may be applied to increase the capacitance density without using additional expensive silicon surface.

According to an exemplary embodiment of the invention, a super-capacitor may be provided comprising or consisting of high-k dielectric clusters and a low-k dielectric matrix or clusters of high-k core/low-k shell deposited simultaneously by thin film technologies.

Having clusters composed of a high-k dielectric dispersed in a low-k dielectric matrix in a film, total capacitance of the film can be very high. When the film is biased, electric current does not flow due to the low-k dielectric matrix between electrodes, also due to a long distance between electrodes. However, electrons may be trapped at the surface of the high-k dielectric cluster due to a different conductivity of the cluster and the matrix. Since the amount of the stored electron may be quite high due to a high dielectric constant of the cluster material, it is possible to achieve extremely high capacitance of the thin film with low leakage current due to the low-k material matrix.

Having clusters composed of a high-k dielectric core with a low-k dielectric shell, the capacitance of the cluster may be varied significantly over a broad range by the thickness of the shell, the size of the core and material compositions of both core and shell. The cluster may behave as a dielectric material and it can be modelled as a series of two parallel capacitors in AC bias. The thickness of the shell can be smaller than the cluster size, therefore the cluster may have a relatively high k-value, and the film of densely packed such clusters can realize an extremely high total capacitance.

The core part can be any high-k dielectric materials. For instance, $BaTiO_3$ may be implemented as a perovskite ferroelectric material, which may have a k-value of more than 10,000, depending on microstructure and processing. This material can be a suitable high-k material for a capacitor according to an exemplary embodiment. Also other perovskite materials such as $SrTiO_3$, $PbZrTiO_3$ and its solid solutions can be used. The shell part can be any low-k dielectric such as metal oxide, metal nitride, metal fluoride, metal chloride and organic dielectric materials. Promising low-k dielectric materials for a capacitor according to an exemplary embodiment is a binary metal oxide such as $SiO_2$, $HfO_2$, $ZrO_2$, $Al_2O_3$, $Y_2O_3$, $La_2O_3$, $Pr_2O_3$, $Gd_2O_3$ and silicate and mixtures of these materials. They may have a relatively low-k value of 10 to 30.

A thin film composed with high-k clusters dispersed in a low-k dielectric matrix or high-k core/low-k shell clusters can be deposited with CVD and ALD. These methods may allow both cluster and matrix to grow simultaneously, so that it is possible to reduce or minimize a mismatch between clusters and matrix, and this may improve electrical properties (a low defect density) in an advantageous way. Using a sol-gel method with a solution including a low-k precursor with high-k particles, the formed thin film will have more mismatch/defect than a thin film formed according to an exemplary embodiment of the invention.

Processing of the thin film deposition according to an exemplary embodiment of the invention may be as follow. First, a homogeneous low-k dielectric layer may be deposited on a substrate such as a silicon substrate or an electrode to prevent a short circuit. Next, high-k dielectric clusters with a low-k material matrix or core-shell clusters may be deposited. Here, a cluster, instead of a homogeneous composite layer, may be influenced significantly depending on deposition condition and material properties. Therefore, an appropriate choice of material combination, precursor and so on may be used as design parameters for manufacturing a capacitor with desired properties.

Capacitor structures according to exemplary embodiments of the invention may allow to obtain particularly the following advantages:

High capacitance with low leakage current

Many material can be applied

It is possible to control size of the cluster and thickness of the shell depending on the deposition condition. Each cluster can be a few 10 nm, also it is possible to deposit a monomolecular layer of a low-k material as a shell, this may allow to obtain a high capacitance.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The words "comprising" and "comprises", and the like, do not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method of manufacturing a capacitor, wherein the capacitor is formed with a capacitor dielectric, the method comprising:
    forming a dielectric matrix of the capacitor dielectric with a first value of permittivity;
    at least partially embedding a plurality of nanoclusters of a second value of permittivity which is larger than the first value of permittivity in the dielectric matrix;
    wherein the plurality of nanoclusters are formed in the dielectric matrix by spontaneous nucleation;
    wherein the plurality of nanoclusters and the dielectric matrix are deposited simultaneously in a common deposition procedure by simultaneously supplying precursors for both the dielectric matrix and the plurality of nanoclusters during a deposition process.

2. The method of claim 1, wherein the plurality of nanoclusters and the dielectric matrix are manufactured by one of the group consisting of a thin film technology, chemical vapour deposition, plasma enhanced chemical vapour deposition, molecular beam epitaxy, sputtering, and atomic layer deposition.

3. The method of claim 1, wherein the plurality of nanoclusters are formed in the dielectric matrix by spontaneous nucleation to form the capacitor dielectric as a highly ordered solid state body with very few defects and with grain boundaries being basically free of structural mismatch.

* * * * *